（12） United States Patent
Jao et al.

(10) Patent No.: US 9,341,933 B2
(45) Date of Patent: May 17, 2016

(54) WAVELENGTH CONVERSION AND FILTERING MODULE AND LIGHT SOURCE SYSTEM

(71) Applicants: Kun-Liang Jao, Hsin-Chu (TW);
Hao-Wei Chiu, Hsin-Chu (TW);
Chi-Hsun Wang, Hsin-Chu (TW);
Ko-Shun Chen, Hsin-Chu (TW);
Chia-He Hsu, Hsin-Chu (TW)

(72) Inventors: Kun-Liang Jao, Hsin-Chu (TW);
Hao-Wei Chiu, Hsin-Chu (TW);
Chi-Hsun Wang, Hsin-Chu (TW);
Ko-Shun Chen, Hsin-Chu (TW);
Chia-He Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 154 days.

(21) Appl. No.: 14/340,567

(22) Filed: Jul. 25, 2014

(65) Prior Publication Data

US 2015/0116982 A1    Apr. 30, 2015

(30) Foreign Application Priority Data

Oct. 31, 2013   (TW) .............................. 102139584 A (51) Int. Cl.

| | | |
|---|---|---|
| *F21V 9/16* | (2006.01) | |
| *G03B 21/20* | (2006.01) | |
| *G02B 27/10* | (2006.01) | |
| *G02B 26/00* | (2006.01) | |
| *H04N 9/31* | (2006.01) | |
| *F21S 10/00* | (2006.01) | |

(52) U.S. Cl.
CPC ........... *G03B 21/2093* (2013.01); *F21S 10/007* (2013.01); *F21V 9/16* (2013.01); *G02B 26/008* (2013.01); *G02B 27/1006* (2013.01); *G03B 21/204* (2013.01); *H04N 9/3114* (2013.01)

(58) Field of Classification Search
CPC . F21S 48/1721; F21S 48/1216; F21S 48/125; F21S 48/1794; F21S 48/1159; F21S 48/328; B60Q 1/076; B60Q 1/0683
USPC ........................................................ 362/512
See application file for complete search history.

(56) References Cited

U.S. PATENT DOCUMENTS

| | | | |
|---|---|---|---|
| 2009/0284148 A1 * | 11/2009 | Iwanaga ............... | G02B 26/008 313/506 |
| 2011/0205502 A1 | 8/2011 | Kato et al. | |
| 2012/0075591 A1 | 3/2012 | Ogura et al. | |

(Continued)

FOREIGN PATENT DOCUMENTS

| | | |
|---|---|---|
| CN | 1790097 | 6/2006 |
| CN | 102073115 | 5/2011 |

(Continued)

OTHER PUBLICATIONS

"Office Action of China Counterpart Application", issued on Nov. 27, 2015, p. 1-p. 8.

(Continued)

*Primary Examiner* — Diane Lee
*Assistant Examiner* — Naomi M Wolford
(74) *Attorney, Agent, or Firm* — Jianq Chyun IP Office (57) ABSTRACT

A wavelength conversion and filtering module that includes a plurality of optical regions is provided. The optical regions are adapted to move, and at least one of the optical regions includes a reflection unit, a wavelength conversion unit, a prism sheet, and a filter unit. The wavelength conversion unit is located between the reflection unit and the prism sheet. The prism sheet is located between the wavelength conversion unit and the filter unit. A light source system is also provided.

21 Claims, 6 Drawing Sheets

(56) References Cited

U.S. PATENT DOCUMENTS

| | | |
|---|---|---|
| 2012/0106126 A1 | 5/2012 | Nojima et al. |
| 2013/0088692 A1 | 4/2013 | Su et al. |
| 2013/0100420 A1 | 4/2013 | Ferri et al. |

FOREIGN PATENT DOCUMENTS

| | | |
|---|---|---|
| CN | 102155639 | 8/2011 |
| CN | 102081210 | 1/2013 |
| CN | 103105659 | 5/2013 |
| CN | 103229319 | 7/2013 |
| JP | 2010237443 | 10/2010 |
| JP | 2012068465 | 4/2012 |
| JP | 2012247625 | 12/2012 |
| JP | 2013057850 | 3/2013 |
| JP | 2013073063 | 4/2013 |
| JP | 2013-210439 | 10/2013 |
| TW | M448705 | 3/2013 |
| TW | 201314344 | 4/2013 |
| TW | 201316112 | 4/2013 |
| TW | 201319718 | 5/2013 |
| WO | 2012077021 | 6/2012 |
| WO | 2013024246 | 2/2013 |

OTHER PUBLICATIONS

"Search Report of Europe Counterpart Application", issued on Mar. 31, 2015, p. 1-p. 6.

"Office Action of Taiwan Counterpart Application", issued on Nov. 24, 2014, p. 1-p. 5.

"Office Action of Japan Counterpart Application," issued on Sep. 1, 2015, p. 1-p. 4.

* cited by examiner

WAVELENGTH CONVERSION AND FILTERING MODULE AND LIGHT SOURCE SYSTEM

CROSS-REFERENCE TO RELATED APPLICATION

This application claims the priority benefit of Taiwan application serial no. 102139584, filed on Oct. 31, 2013. The entirety of the above-mentioned patent application is hereby incorporated by reference herein and made a part of this specification.

BACKGROUND

1. Field of the Disclosure

The invention relates to a wavelength conversion module and an optical system, and more particularly to a wavelength conversion and filtering module and a light source system.

2. Description of Related Art

Recently, projection apparatuses featuring solid-state light sources such as light-emitting diode (LED) and laser diode have gradually become dominant in the market. A laser diode has luminance efficiency approximately higher than 20%, and thus, in order to breakthrough the limitation to the LED light source, a pure color light source for a projector, which is produced by a laser light source exciting phosphor, is gradually developed. In a laser projection apparatus, the laser light source not only can excite the phosphor to emit light but also can act as the direct light source which provides illumination to the projector. Besides, the number of the light sources may be adjusted in response to different demands of various projectors for brightness. Accordingly, the projector with a laser light source system has great potential to replace the conventional high-pressure mercury lamp and become the next-generation mainstream projector.

Generally, in the existing laser projector, the phosphor is mixed with silicone, and the mixture is coated onto the substrate with high reflectivity to construct a phosphor wheel. However, silicone cannot bear high temperature and is apt to become degraded; therefore, if the laser beam excites the phosphor with silicone of the phosphor wheel for a long period of time, silicone that is not high-temperature resistant may be easily degraded or damaged by the high temperature. This may pose a negative impact on the light-emitting efficiency of the phosphor.

Taiwan Patent Publication no. 201319718 discloses a color wheel component suitable for a projector. Taiwan Patent no. M448705 discloses a light wavelength conversion wheel set. China Patent no. 102073115 discloses a phosphor color wheel suitable for a projection system. U.S. Patent Publication no. 2013/0088692 discloses an illumination system.

SUMMARY OF THE DISCLOSURE

The invention is directed to a wavelength conversion and filtering module which is characterized by favorable optical quality, reliability, and long service life.

The invention is directed to a light source system having favorable light-emitting spectrum and reliability.

Additional aspects and/or advantages of the invention will be set forth in part in the description which follows and, in part, will be obvious from the description, or may be learned by practice of the invention.

To achieve one of, a part of or all of the above-mentioned objectives, or to achieve other objectives, an embodiment of the invention provides a wavelength conversion and filtering module that includes a plurality of optical regions. The optical regions are adapted to move, and at least one of the optical regions is a wavelength conversion and filtering region. The wavelength conversion and filtering region includes a reflection unit, a wavelength conversion unit, a prism sheet, and a filter unit. The wavelength conversion unit is located between the reflection unit and the prism sheet. The prism sheet is located between the wavelength conversion unit and the filter unit.

To achieve one of, a part of or all of the above-mentioned objectives, or to achieve other objectives, an embodiment of the invention provides a light source system that includes an exciting light source and a wavelength conversion and filtering module. The wavelength conversion and filtering module includes a plurality of optical regions. The optical regions are adapted to move and insert into a transmission path of an exciting beam in turn, and at least one of the optical regions is a wavelength conversion and filtering region. The wavelength conversion and filtering region includes a reflection unit, a wavelength conversion unit, a prism sheet, and a filter unit. The wavelength conversion unit is located between the reflection unit and the prism sheet. The prism sheet is located between the wavelength conversion unit and the filter unit.

In an embodiment of the invention, the wavelength conversion and filtering module further includes a cover located between the prism sheet and the filter unit. The reflection unit includes: a substrate having a first trench, and a reflection portion located between the substrate and the wavelength conversion unit, An accommodation space is defined between the first trench of the substrate and the cover for accommodating the reflection portion, the wavelength conversion unit, and the prism sheet.

In an embodiment of the invention, the substrate is a transparent substrate, and the reflection portion is a reflective coating film coated onto the substrate.

In an embodiment of the invention, the reflection unit is a reflection substrate, and the wavelength conversion and filtering module further includes: a cover located between the prism sheet and the filter unit, the cover having a second trench. An accommodation space is defined between the reflection unit and the second trench of the cover for accommodating the wavelength conversion unit and the prism sheet.

In an embodiment of the invention, the filter unit includes: an anti-reflection layer; and a filter layer located between the anti-reflection layer and the prism sheet.

In an embodiment of the invention, the wavelength conversion unit includes a phosphor material.

In an embodiment of the invention, a material of the wavelength conversion unit is phosphor, and the phosphor is neither encapsulated by nor mixed with silicone.

In an embodiment of the invention, at least another one of the optical regions is a transparent region, and the wavelength conversion and filtering module further includes: a light combining unit, wherein when the wavelength conversion and filtering region inserts into the transmission path of the exciting beam, the exciting beam is converted into a converted beam by the wavelength conversion unit, the converted beam is reflected by the reflection unit and transmitted to the filter unit through the prism sheet, the filter unit is adapted to be penetrated by a portion of a wavelength of the converted beam to form a filtered beam, when the transparent region inserts into the transmission path of the exciting beam, the exciting beam passes through the transparent region, a color of the filtered beam is different from a color of the exciting beam, and the light combining unit is located on the transmission path of the exciting beam and a transmission path of the filtered beam and combines the exciting beam and the filtered beam into an illumination beam In an embodiment of the invention, the transparent region includes a first transparent layer, and the first transparent layer is made of a transparent material.

In an embodiment of the invention, at least another one of the optical regions is a transparent region, and the transparent region includes a hollow region.

In an embodiment of the invention, the optical regions are located at peripheries of the wavelength conversion and filtering module.

Based on the description above, the embodiments of the invention may achieve at least one of the following advantages or effects. By means of the wavelength conversion unit operating with the prism sheet, the wavelength conversion and filtering module and the light source system described in the embodiments of the invention may achieve favorable light utilization efficiency and prevent the wavelength conversion and filtering module from being damaged by high temperature. Thereby, the wavelength conversion and filtering module and the light source system described herein may have sufficient light-emitting spectrum, favorable reliability, and long service life.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention could be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
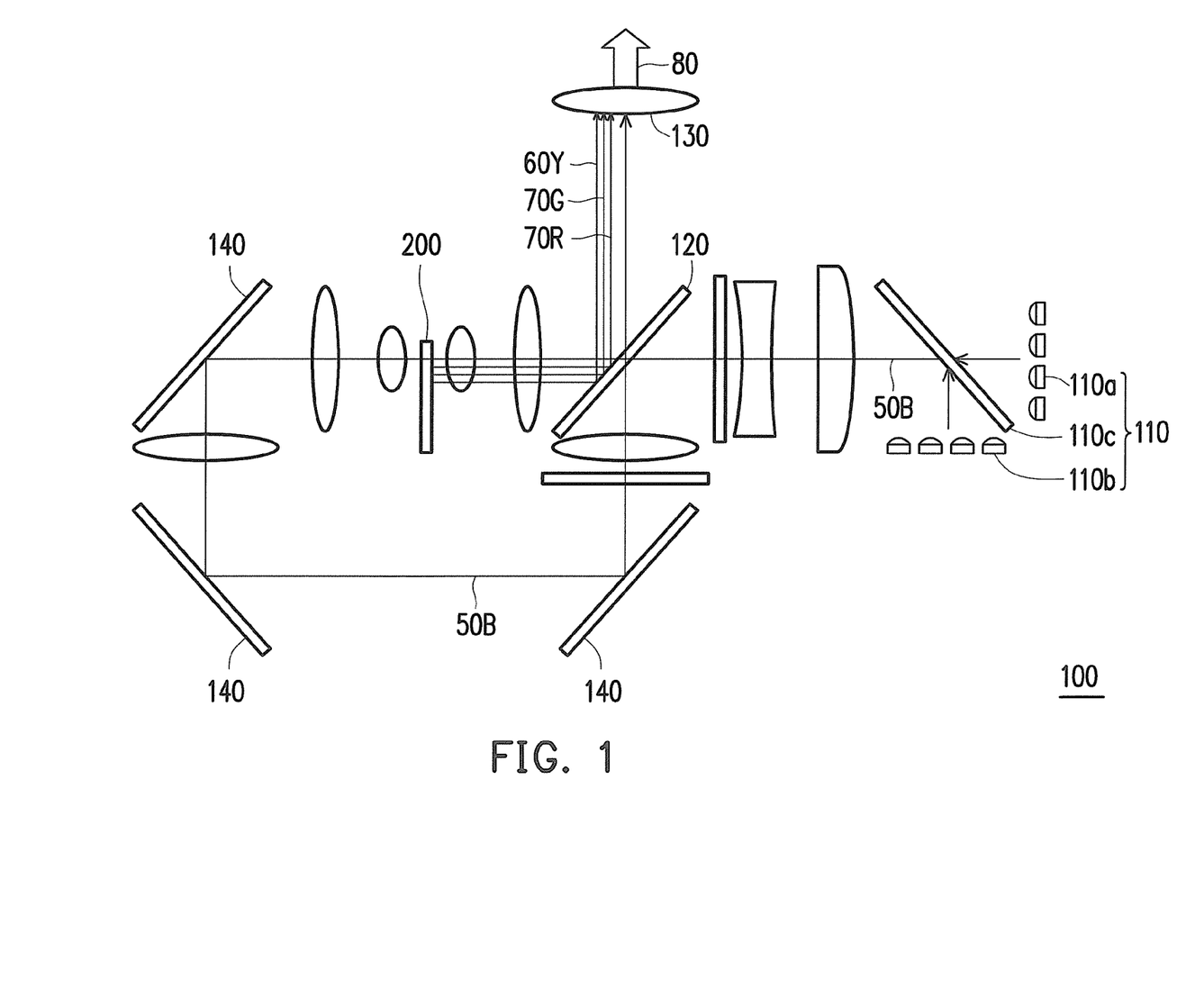
FIG. 1 is a schematic diagram illustrating a framework of a light source system according to an embodiment of the invention.

FIG. 1 is a schematic diagram illustrating a framework of a light source system according to an embodiment of the invention. With reference to FIG. 1, the light source system 100 described in the embodiment includes an exciting light source 110, a wavelength conversion and filtering module 200, a light splitting unit 120, and a light combining unit 130. The exciting light source 110 is configured to provide an exciting beam 50B. In the embodiment, the exciting light source 110 is a laser light source, and the exciting beam 50B is a laser beam. For instance, the exciting light source 110 may be a blue laser diode bank, and the exciting beam 50B is a blue laser beam; however, the invention is not limited thereto. In FIG. 1, the exciting light source 110 includes two blue laser diode banks 110a and 110b and a beam-combining device 110c. The beam-combining device 110c is a reflection sheet having plural through holes, and the through holes allow the laser beam emitted from the blue laser diode bank 110a to pass through. Besides, the reflection surface of the reflection sheet reflects the laser beam emitted from the blue laser diode bank 110b. Therefore, the laser beams emitted from the blue laser diode banks 110a and 110b may be combined as the exciting beam 50B by the beam-combining device 110c.

The light splitting unit 120 is located on a transmission path of the exciting beam 50B and located between the exciting light source 110 and the wavelength conversion and filtering module 200. Specifically, the light splitting unit 120 is a dichroic mirror or a dichroic prism capable of achieving different optical effects on beams with different colors. For instance, in the embodiment, the light splitting unit 120 allows the blue beam to pass through and reflects beams with other colors (e.g., red, green, yellow, and so on). That is, the exciting beam 50B in the color of blue is able to pass through the light splitting unit 120, and thereby the exciting beam 50B may pass through the light splitting unit 120 and then enter the wavelength conversion and filtering module 200.

Figure 2A:
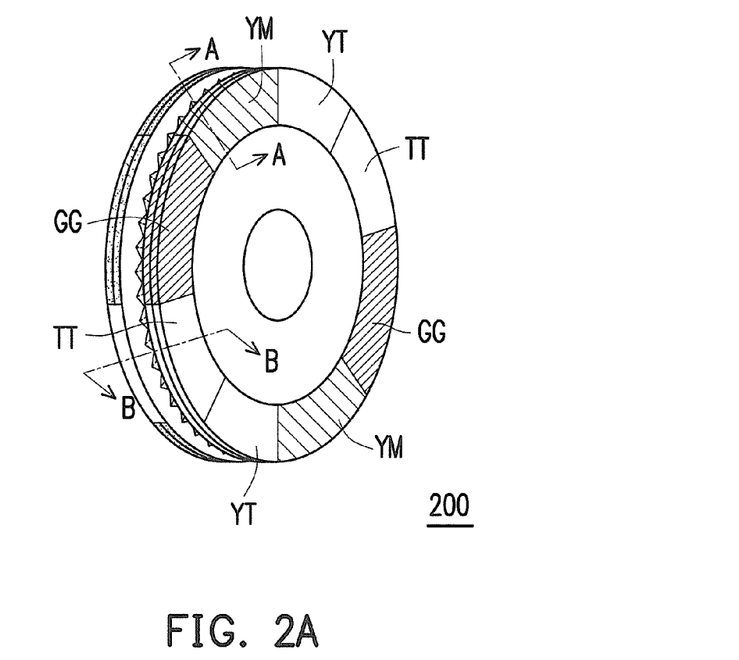
FIG. 2A is a schematic diagram illustrating the wavelength conversion and filtering module depicted in FIG. 1.
Figure 2B:
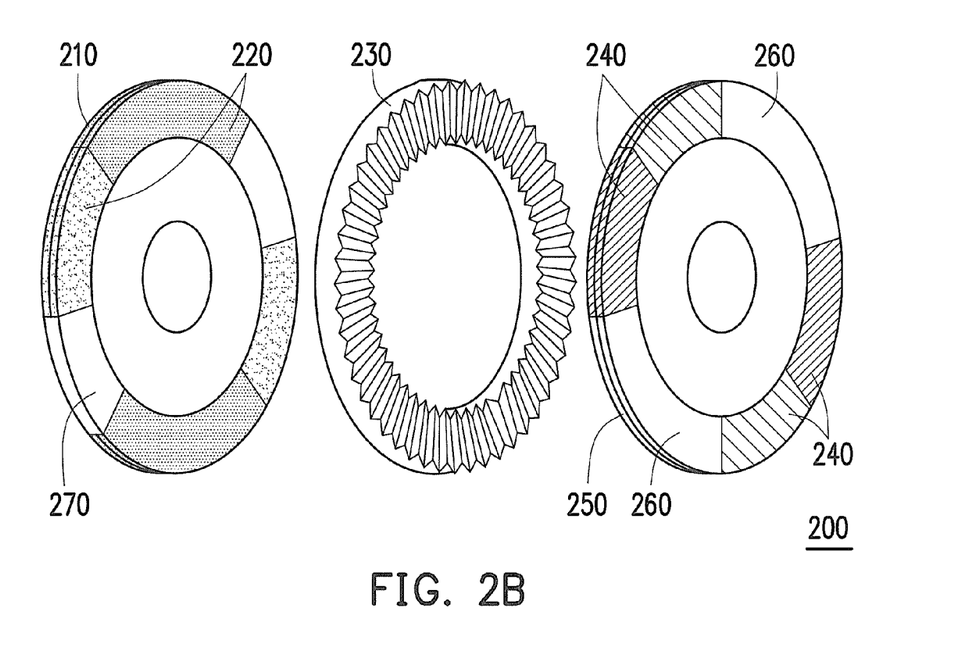
FIG. 2B is an exploded diagram illustrating the wavelength conversion and filtering module depicted in FIG. 2A.

FIG. 2A is a schematic diagram illustrating the wavelength conversion and filtering module depicted in FIG. 1. FIG. 2B is an exploded diagram illustrating the wavelength conversion and filtering module depicted in FIG. 2A. In the embodiment, the wavelength conversion and filtering module 200 includes a plurality of optical regions GG, YM, YT, and TT. As shown in FIG. 2A, in the embodiment, the wavelength conversion and filtering module 200 is shaped as a plate and may be a combination of a wavelength conversion wheel and a color filter wheel, for instance. The optical regions GG, YM, YT, and TT may be disposed in a ring-shaped manner in the peripheries of the wavelength conversion and filtering module 200, and the optical regions GG, YM, YT, and TT are adapted to move; that is, the optical regions GG, YM, YT, and TT are adapted to rotate around a pivot axis (not shown). Besides, the optical regions GG, YM, YT, and TT may insert into the transmission path of the exciting beam 50B in turn; however, the invention is not limited thereto. At least one of the optical regions GG, YM, YT, and TT is a wavelength conversion and filtering region. For instance, in the embodiment, the optical regions GG and YM are the wavelength conversion and filtering regions.

As shown in FIG. 2B, in the embodiment, the optical regions GG and YM (i.e., the wavelength conversion and filtering regions) include a reflection unit 210, a wavelength conversion unit 220, a prism sheet 230, and a filter unit 240. In particular, phosphor in the wavelength conversion unit 220 of the optical regions GG and YM may be formed by sintering, coating, or depositing process, for instance. The detailed structure of the wavelength conversion and filtering region will be elaborated hereinafter with reference to FIG. 3.

Figure 3:
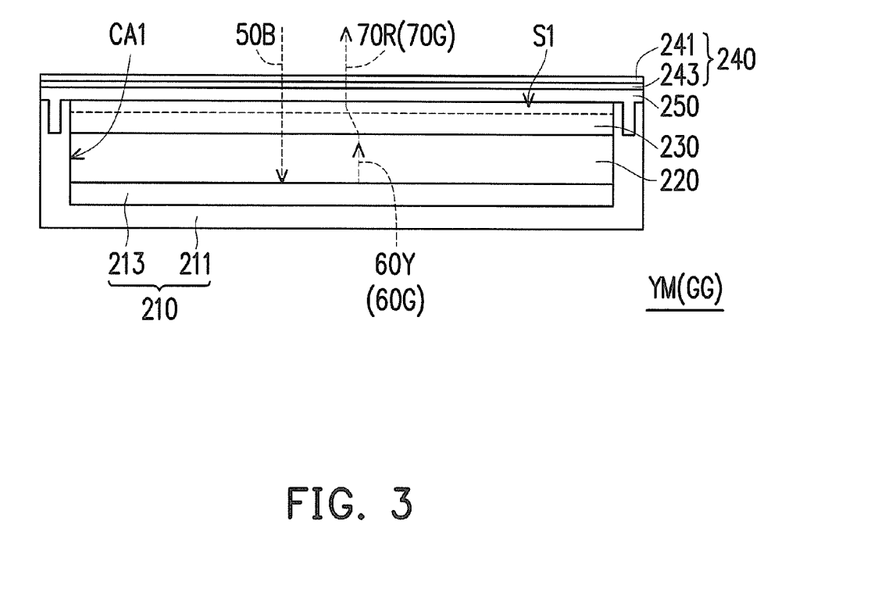
FIG. 3 is a schematic cross-sectional diagram illustrating an optical region depicted in FIG. 2A along a line A-A.
Figure 4:
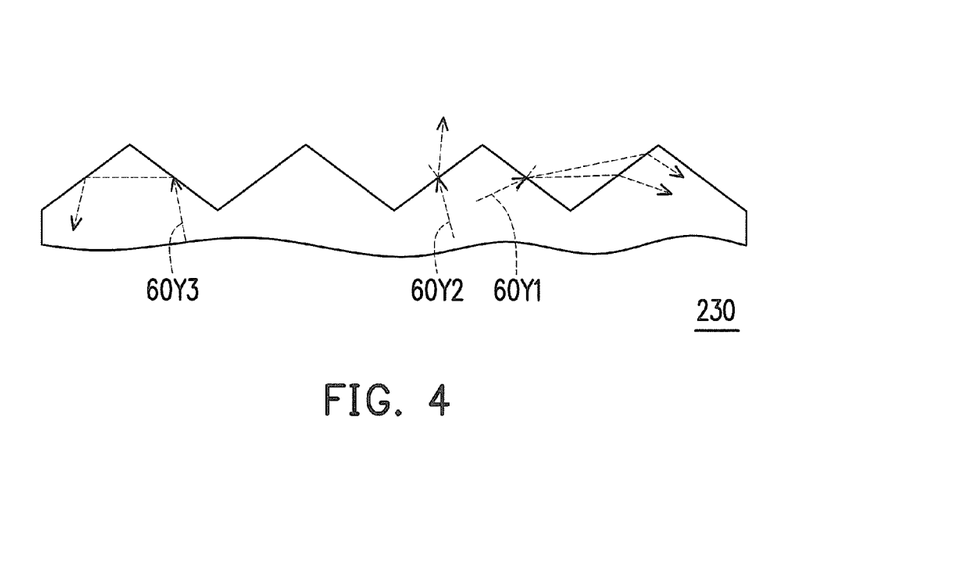
FIG. 4 is a schematic diagram illustrating a light path in the prism sheet depicted in FIG. 2A.

FIG. 3 is a schematic cross-sectional diagram illustrating an optical region depicted in FIG. 2A along a line A-A. FIG. 4 is a schematic diagram illustrating a light path in the prism sheet depicted in FIG. 2A. With reference to FIG. 3, in the embodiment, the wavelength conversion and filtering module 200 further includes a cover 250, and the reflection unit 210 includes a substrate 211 and a reflection portion 213. Specifically, in the embodiment, the cover 250 and the substrate 211 are made of a transparent material; namely, the substrate 211 is a transparent substrate. Besides, the cover 250 (or the substrate 211) of each of the optical regions GG, YM, and YT described in the embodiment is integrally formed, and the reflection portion 213 is a reflective coating film coated onto the substrate 211.

According to the embodiment, the wavelength conversion unit 220 in the optical region YM (GG) is located between the reflection unit 210 and the prism sheet 230, the prism sheet 230 is located between the wavelength conversion unit 220 and the filter unit 240, and the cover 250 is located between the prism sheet 230 and the filter unit 240. In detail, the substrate 211 has a first trench CA1. If the wavelength conversion and filtering module 200 is shaped as a circular plate, the first trench CA1 may be a corresponding arc-shaped trench. The reflection portion 213 is located between the substrate 211 and the wavelength conversion unit 220. An accommodation space S1 is defined between an inner surface of the first trench CA1 of the substrate 211 and the cover 250 for accommodating the reflection portion 213, the wavelength conversion unit 220, and the prism sheet 230. That is, as illustrated in FIG. 3, the components disposed from the side of the reflection unit 210 to the side of the filter unit 240 are sequentially the substrate 211 of the reflection unit 210, the reflection portion 213 of the reflection unit 210, the wavelength conversion unit 220, the prism sheet 230, the cover 250, and the filter unit 240 according to the embodiment. In addition, with reference to FIG. 3, the filter unit 240 described herein may include an anti-reflection layer 241 and a filter layer 243. The filter layer 243 is located between the anti-reflection layer 241 and the prism sheet 230; particularly, the filter layer 243 may be adhered or bonded to a surface of the cover 250. Thereby, the anti-reflection layer 241 is able to increase the ratio of the exciting beam 50B entering the cover 250 and further irradiating the wavelength conversion unit 220.

From another perspective, in the wavelength conversion and filtering module described in the embodiment and depicted in FIG. 3, the wavelength conversion unit 220 may be disposed in the first trench CA1 of the substrate 211 and may be further sequentially covered by the prism sheet 230 and the cover 250, so as to complete the packaging process performed on the wavelength conversion unit 220 (i.e., the phosphor). Hence, the wavelength conversion unit 220 (i.e., the phosphor) is neither encapsulated by nor mixed with silicone. Thereby, the reduction of the light-emitting efficiency of the wavelength conversion unit 220 (i.e., the phosphor) caused by silicone that is incapable of bearing the high temperature resulting from the significant energy of the exciting beam 50B may be prevented, and so may the damages to the wavelength conversion and filtering module 200.

In particular, as illustrated in FIG. 1 and FIG. 2A, the optical regions GG, YM, YT, and TT in the wavelength conversion and filtering module 200 are adapted to move and may insert into the transmission path of the exciting beam 50B in turn to achieve different effects on the exciting beam 50B. For instance, in FIG. 1 and FIG. 3, when the optical region YM (GG) inserts into the transmission path of the exciting beam 50B, the exciting beam 50B is converted into at least one converted beam 60Y (60G) by the wavelength conversion unit 220 in the optical region YM (GG), and the wavelength of the converted beam 60Y (60G) is different from that of the exciting beam 50B. In general, the thermal effects lead to an accelerated reduction of the conversion efficiency of the red phosphor, and the conversion efficiencies of the green phosphor and the yellow phosphor are both greater than that of the red phosphor. Hence, in the embodiment, the wavelength conversion unit 220 in the optical region YM (GG) is made of the green phosphor or the yellow phosphor, for instance, so as to generate the yellow converted beam 60Y or green converted beam 60G; however, the invention is not limited thereto.

With reference to FIG. 3, the converted beam 60Y (60G) is reflected by the reflection portion 213 of the reflection unit 210 and transmitted to the filter unit 240 through the prism sheet 230. The transmission spectrum of the filter layer 243 of the filter unit 240 is relevant to the incident angle of the beam; hence, if the converted beam 60Y (60G) is incident on the filter layer 243 with a large incident angle, the wavelength converted beam 60Y (60G) will be shifted to short wavelength, and thus the wavelength conversion and filtering module 200 is not able to have the required pure color light. To prevent said issue from occurring, the micro-structures (not numbered) on the prism sheet 230 may be designed to be capable of collimating the converted beam 60Y (or 60G) from the wavelength conversion unit 220. For instance, as shown in FIG. 4, when the converted beam 60Y1 is emitted at a large angle from one of the micro-structures on the prism sheet 230, the converted beam 60Y1 may be refracted by another one of the micro-structures on the prism sheet 230 and transmitted back into the prism sheet 230, so as to enhance the light utilization efficiency. Besides, as shown in FIG. 4, when the converted beam 60Y3 entering the prism 230 is to be emitted at a large angle from the prism sheet 230, the converted beam 60Y3 may be totally reflected by the prism sheet 230, and thereby the light utilization efficiency is improved as well. The design of the micro-structures on the prism sheet 230 allows parts of the converted beam 60Y2 to be emitted at a small angle from the prism sheet 230 to the filter unit 240 (shown in FIG. 3); such that the converted beam 60Y2 may be collimated. Due to the prism sheet 230 in the wavelength conversion and filtering module 200, the angle at which the converted beam 60Y (or 60G) enters the filter unit 240 may be reduced, and thus the wavelength conversion and filtering module 200 is able to have the required pure color light and is simultaneously characterized by the favorable light utilization efficiency.

With reference to FIG. 3, the filter layer 243 of the filter unit 240 is adapted to be penetrated by a portion of a wavelength of at least one converted beam 60Y (or 60G) to correspondingly form at least one filtered beam 70R (or 70G). Specifically, in the embodiment, the filter units 240 in the optical regions GG and YM may be color filters with different colors (e.g., green or magenta), so as to generate filtered beams 70G and 70R with different colors. Here, colors of the filtered beams 70G and 70R are different from the color of the exciting beam 50B.

As shown in FIG. 2B, in the embodiment, the filter units 240 in form of the color filters with different colors may be combined with the wavelength conversion units 220 with phosphor in different colors to form different optical regions, so as to generate the filtered beams 70G and 70R with different colors. For instance, the optical region GG has the wavelength conversion unit 220 with the green phosphor and the filter unit 240 in form of the green color filter. Thereby, the exciting beam 50B entering the optical region GG may be converted into the green converted beam 60G and the green filtered beam 70G in sequence. The optical region YM has the wavelength conversion unit 220 with the yellow phosphor and the filter unit 240 in form of the magenta color filter. Thereby, the exciting beam 50B entering the optical region YM may then be converted into the yellow converted beam 60Y and the magenta filtered beam 70R in sequence.

Note that other optical regions in the wavelength conversion and filtering module 200 may have different structures, as shown in FIG. 2A and FIG. 2B, so as to provide beams whose colors are different from that of the exciting beam 50B. For instance, as shown in FIG. 2B, the optical region YT is formed sequentially by the reflection unit 210, the wavelength conversion unit 220, the prism sheet 230, the cover 250, and a first transparent layer 260 and does not have the filter unit 240. In the embodiment, the first transparent layer 260 is made of a transparent material that allows light to pass through. When the optical region YT inserts into the transmission path of the exciting beam 50B, the exciting beam 50B is converted into the converted beam 60Y by the wavelength conversion unit 220 in the optical region YT. According to the embodiment, the wavelength conversion unit 220 in the optical region YT is made of yellow phosphor, and the color of the converted beam 60Y is yellow. The converted beam 60Y is then reflected by the reflection unit 210 and passes through the prism sheet 230 and the first transparent layer 260. The optical region YT can thereby provide the yellow converted beam 60Y.

At least another one of the optical regions in the wavelength conversion and filtering module 200 is a transparent region. The detailed structure of the transparent region will be elaborated hereinafter with reference to FIG. 5.

Figure 5:
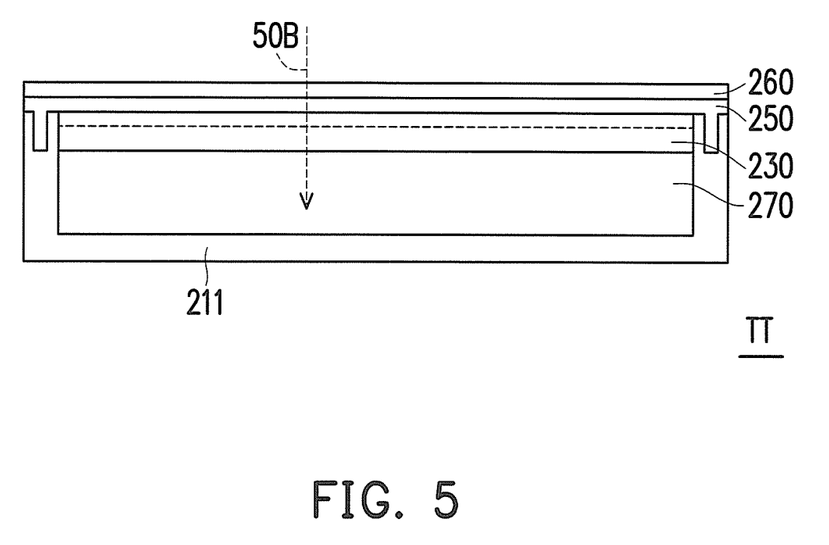
FIG. 5 is a schematic cross-sectional diagram illustrating another optical region depicted in FIG. 2A along a line B-B.

FIG. 5 is a schematic cross-sectional diagram illustrating another optical region depicted in FIG. 2A along a line B-B.

With reference to FIG. 2A, FIG. 2B, and FIG. 5, in the embodiment, the optical region TT is a transparent region and is formed by a second transparent layer 270, a prism sheet 230, a cover 250, and a first transparent layer 260. Specifically, the second transparent layer 270 is made of a transparent material, and the transparent material may be the same as or different from the material of the substrate 211 of the reflection unit 210. The invention is not limited thereto. According to the embodiment, the reflection units 210 in the adjacent optical regions YT and GG may be connected to each other through the second transparent layer 270 in the optical region TT. In addition, if the substrate 211 of the reflection unit 210 is a transparent substrate, the second transparent layer 270 in the optical region TT and the substrates 211 of the reflection units 210 in the adjacent optical regions YT and GG may be integrally formed.

Thereby, as shown in FIG. 1 and FIG. 2A, when the optical region TT inserts into the transmission path of the exciting beam 50B, the exciting beam 50B directly passes through the optical region TT, is again transmitted to the light splitting unit 120 through an optical transmission module 140, and passes through the light splitting unit 120 and is transmitted to the light combining unit 130.

In another aspect, as shown in FIG. 1, after the converted beam 60Y and the filtered beams 70G and 70R are generated, these beams may be transmitted to and reflected by the light splitting unit 120 and may then be transmitted to the light combining unit 130. The light combining unit 130 provided in the embodiment is located on the transmission paths of the exciting beam 50B, the converted beam 60Y, and the filtered beams 70G and 70R and combines these beams into an illumination beam 80 in a required color. By means of the wavelength conversion unit 220 operating with the prism sheet 230, the light source system 100 having the wavelength conversion and filtering module 200 may ensure the filtered beams 70G and 70R to have the required pure color light and prevent the wavelength conversion and filtering module 200 from being damaged by high temperature. As a result, the wavelength conversion and filtering module 200 and the light source system 100 described herein may have sufficient light-emitting spectrum and satisfactory quality.

Although the light splitting unit 120 described herein is a dichroic mirror or a dichroic prism that allows the blue exciting beam 50B to pass through and reflects beams with other colors (e.g., red, green, yellow, and so on), it should be mentioned that the invention is not limited thereto. In another embodiment of the invention, the light splitting unit 120 also may be a dichroic mirror, a dichroic prism, or any other similar dichroic device that reflect the blue exciting beam 50B and allows beams with other colors (e.g., red, green, yellow, and so on) to pass through. People having ordinary skill in the art are able to have the light splitting unit 120 accomplish similar light splitting effects based on actual requirements by properly designing the light paths of the exciting beam 50B, the converted beam 60Y and the filtered beams 70G and 70R, which will not be elaborated hereinafter.

Besides, the substrate 211 of the reflection unit 210 is a transparent substrate, for instance, and the optical region TT is made of a transparent material; however, the invention is not limited thereto. In another embodiment of the invention, the material of the substrate 211 of the reflection unit 210 may include a metallic material, and the optical region TT (i.e., the transparent region) may include a hollow region EA, which will be elaborated hereinafter with reference to FIG. 6A to FIG. 8.

Figure 6A:
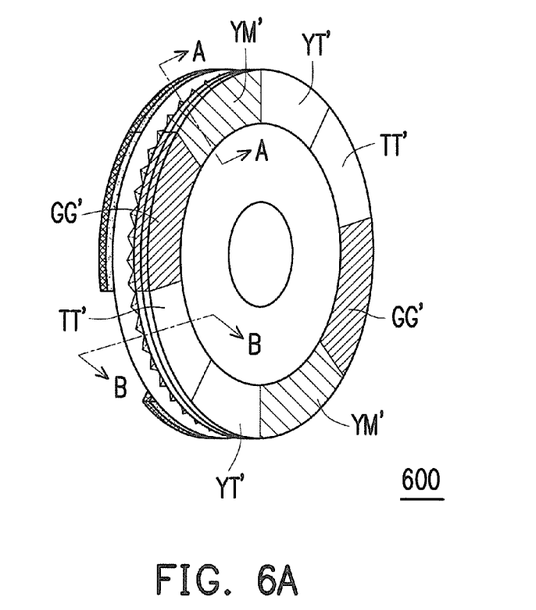
FIG. 6A is a schematic diagram illustrating the wavelength conversion and filtering module depicted in FIG. 1 according to another embodiment of the invention.
Figure 6B:
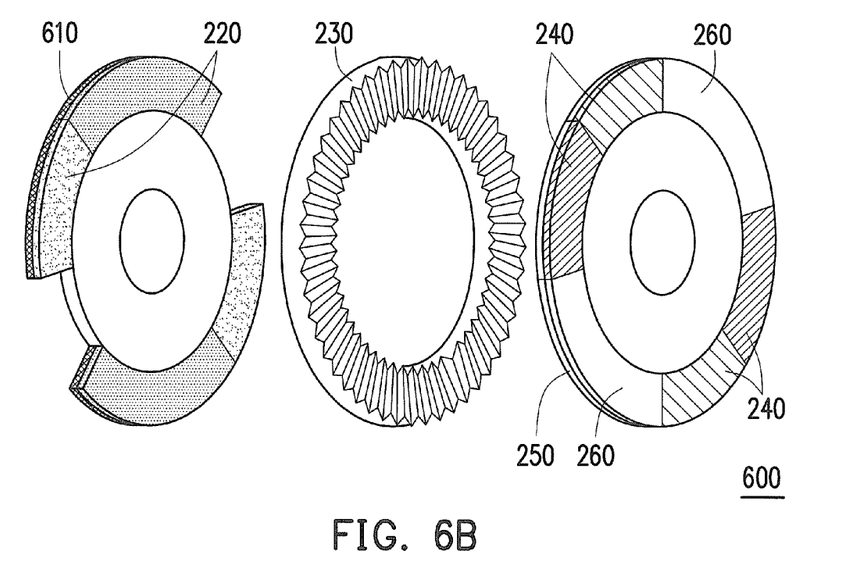
FIG. 6B is an exploded diagram illustrating the wavelength conversion and filtering module depicted in FIG. 6A.
Figure 7:
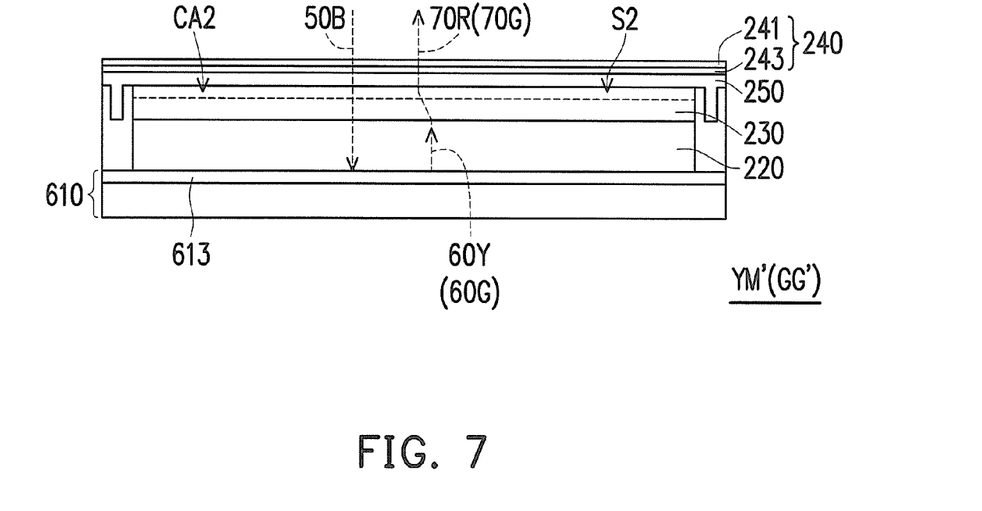
FIG. 7 is a schematic cross-sectional diagram illustrating an optical region depicted in FIG. 6A along a line A'-A'.

FIG. 6A is a schematic diagram illustrating the wavelength conversion and filtering module depicted in FIG. 1 according to another embodiment of the invention. FIG. 6B is an exploded diagram illustrating the wavelength conversion and filtering module depicted in FIG. 6A. FIG. 7 is a schematic cross-sectional diagram illustrating an optical region depicted in FIG. 6A along a line A'-A'. With reference to FIG. 6A and FIG. 6B, in the embodiment, the wavelength conversion and filtering module 600 depicted in FIG. 6B is similar to the wavelength conversion and filtering module 200 depicted in FIG. 2B and also includes a plurality of optical regions GG', YM', YT', and TT'. The optical region YM' (or GG') depicted in FIG. 7 is similar to the optical region YM (or GG) depicted in FIG. 3 and is a wavelength conversion and filtering region as well; the differences are described hereinafter. Particularly, as shown in FIG. 6B and FIG. 7, the reflection unit 610 in the optical region YM' (or GG') is a reflection substrate. A material of the reflection unit 610 includes aluminum, and the reflection unit 610 may reflect the converted beam 60Y (or 60G) and achieve sufficient heat dissipation effects.

The reflection unit 610 may further include a reflective coating film 613 coated between a surface of the reflection unit 610 and the wavelength conversion unit 220, so as to further enhance the reflectivity of the converted beam 60Y (or 60G). As shown in FIG. 7, the cover 250 described in the embodiment has a second trench CA2; if the wavelength conversion and filtering module 600 is shaped as a circular plate, the second trench CA2 may be a corresponding arc-shaped trench, and the reflection unit 610 may be adhered or bonded to the cover 250. Therefore, an accommodation space S2 is defined between the reflection unit 610 and an inner surface of the second trench CA2 of the cover 250 for accommodating the wavelength conversion unit 220 and the prism sheet 230.

Thereby, in the embodiment, the wavelength conversion unit 220 of the wavelength conversion and filtering module 600 may be disposed into the accommodation space S2 formed between the reflection unit 610 and the second trench CA2 of the cover 250, so as to complete the packaging process performed on the wavelength conversion unit 220 (i.e., the phosphor). Hence, the wavelength conversion unit 220 (i.e., the phosphor) described in the embodiment is neither encapsulated by nor mixed with silicone. As a result, the reduction of the light-emitting efficiency of the wavelength conversion unit 220 (i.e., the phosphor) caused by silicone that is incapable of bearing the high temperature resulting from the significant energy of the exciting beam 50B may be prevented, and so may the damages to the wavelength conversion and filtering module 600. Since the advantages and effects of the wavelength conversion and filtering module 600 are similar to those of the wavelength conversion and filtering module 200, no further explanation is provided hereinafter.

Figure 8:
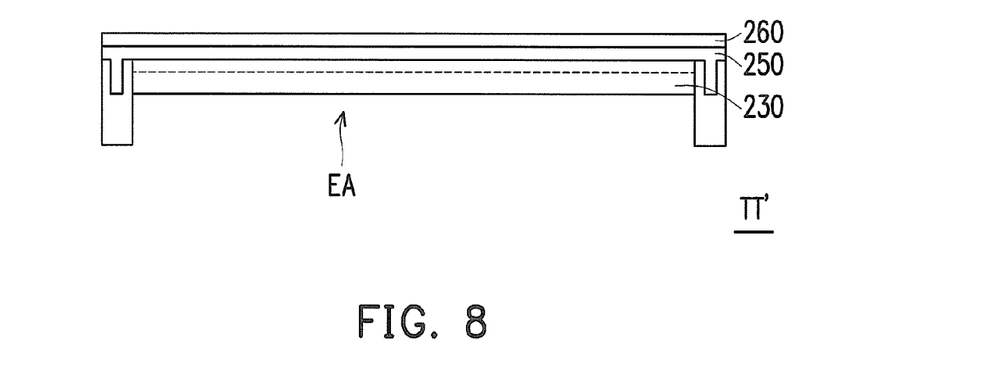
FIG. 8 is a schematic cross-sectional diagram illustrating another optical region depicted in FIG. 6A along a line B'-B'.

FIG. 8 is a schematic cross-sectional diagram illustrating another optical region depicted in FIG. 6A along a line B'-B'. With reference to FIG. 8, the optical region TT' depicted in FIG. 8 is similar to the optical region TT depicted in FIG. 5 and is also a transparent region, while the difference therebetween is described below. In the embodiment, the optical region TT' of the wavelength conversion and filtering module 600 is formed sequentially by the first transparent layer 260, the cover 250, and the prism sheet 230. The reflection units 210 of the optical regions YT' and GG' are not connected to each other; therefore, the optical region TT' includes a hollow region EA (as shown in FIG. 6A-FIG. 6B and FIG. 8) between the reflection units 210 of the optical regions YT' and GG'. Besides, the optical region TT' described herein may not have the prism sheet 230. That is, in FIG. 6B, a portion of the prism sheet in the optical region TT' may be selectively formed. Thereby, the optical region TT' allows the exciting beam 50B to pass through and achieve effects similar to those accomplished by the optical region TT; hence, no further explanation is provided hereinafter.

To sum up, the embodiments of the invention may achieve at least one of the following advantages or effects. By means of the wavelength conversion unit operating with the prism sheet, the wavelength conversion and filtering module and the light source system described in the embodiments of the invention may achieve favorable light utilization efficiency and prevent the phosphor (packaged into the wavelength conversion and filtering module) from being damaged by high temperature. Thereby, the wavelength conversion and filtering module and the light source system described herein may have sufficient light-emitting spectrum, favorable reliability, and long service life. Moreover, any projection apparatus equipped with said wavelength conversion and filtering module and said light source system may also have the above-mentioned advantages and achieve similar effects.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Apparently, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:
1. A wavelength conversion and filtering module comprising:
    a plurality of optical regions adapted to move, at least one of the optical regions being a wavelength conversion and filtering region, and the wavelength conversion and filtering region comprising:
        a reflection unit;
        a wavelength conversion unit;

a prism sheet, wherein the wavelength conversion unit is located between the reflection unit and the prism sheet; and
a filter unit, wherein the prism sheet is located between the wavelength conversion unit and the filter unit.

2. The wavelength conversion and filtering module as recited in claim 1, further comprising a cover located between the prism sheet and the filter unit, the reflection unit comprising:
a substrate having a first trench; and
a reflection portion located between the substrate and the wavelength conversion unit, an accommodation space defined between the first trench of the substrate and the cover for accommodating the reflection portion, the wavelength conversion unit, and the prism sheet.

3. The wavelength conversion and filtering module as recited in claim 2, wherein the substrate is a transparent substrate, and the reflection portion is a reflective coating film coated onto the substrate.

4. The wavelength conversion and filtering module as recited in claim 1, wherein the reflection unit is a reflection substrate, and the wavelength conversion and filtering module further comprises:
a cover located between the prism sheet and the filter unit, the cover having a second trench, an accommodation space defined between the reflection unit and the second trench of the cover for accommodating the wavelength conversion unit and the prism sheet.

5. The wavelength conversion and filtering module as recited in claim 1, wherein the filter unit comprises:
an anti-reflection layer; and
a filter layer located between the anti-reflection layer and the prism sheet.

6. The wavelength conversion and filtering module as recited in claim 1, wherein the wavelength conversion unit comprises a phosphor material.

7. The wavelength conversion and filtering module as recited in claim 1, wherein a material of the wavelength conversion unit is phosphor, and the phosphor is neither encapsulated by nor mixed with silicone.

8. The wavelength conversion and filtering module as recited in claim 1, wherein the optical regions are located at peripheries of the wavelength conversion and filtering module.

9. The wavelength conversion and filtering module as recited in claim 1, wherein at least another one of the optical regions is a transparent region, the transparent region comprises a first transparent layer, and the first transparent layer is made of a transparent material.

10. The wavelength conversion and filtering module as recited in claim 1, wherein at least another one of the optical regions is a transparent region, and the transparent region comprises a hollow region.

11. A light source system comprising:
an exciting light source providing an exciting beam; and
a wavelength conversion and filtering module comprising:
a plurality of optical regions adapted to move and insert into a transmission path of the exciting beam in turn, at least one of the optical regions being a wavelength conversion and filtering region, the wavelength conversion and filtering region comprising:
a reflection unit;
a wavelength conversion unit;
a prism sheet, wherein the wavelength conversion unit is located between the reflection unit and the prism sheet; and
a filter unit, wherein the prism sheet is located between the wavelength conversion unit and the filter unit.

12. The light source system as recited in claim 11, wherein the wavelength conversion and filtering module further comprises a cover located between the prism sheet and the filter unit, and the reflection unit comprises:
a substrate having a first trench; and
a reflection portion located between the substrate and the wavelength conversion unit, an accommodation space defined between the first trench of the substrate and the cover for accommodating the reflection portion, the wavelength conversion unit, and the prism sheet.

13. The light source system as recited in claim 12, wherein the substrate is a transparent substrate, and the reflection portion is a reflective coating film coated onto the substrate.

14. The light source system as recited in claim 11, wherein the reflection unit is a reflection substrate, and the wavelength conversion and filtering module further comprises:
a cover located between the prism sheet and the filter unit, the cover having a second trench, an accommodation space defined between the reflection unit and the second trench of the cover for accommodating the wavelength conversion unit and the prism sheet.

15. The light source system as recited in claim 11, wherein the filter unit comprises:
an anti-reflection layer; and
a filter layer located between the anti-reflection layer and the prism sheet.

16. The light source system as recited in claim 11, wherein the wavelength conversion unit comprises a phosphor material.

17. The light source system as recited in claim 11, wherein a material of the wavelength conversion unit is phosphor, and the phosphor is neither encapsulated by nor mixed with silicone.

18. The light source system as recited in claim 11, wherein the optical regions are located at peripheries of the wavelength conversion and filtering module.

19. The light source system as recited in claim 11, wherein at least another one of the optical regions is a transparent region, and the wavelength conversion and filtering module further comprises:
a light combining unit, wherein when the wavelength conversion and filtering region inserts into the transmission path of the exciting beam, the exciting beam is converted into a converted beam by the wavelength conversion unit, the converted beam is reflected by the reflection unit and transmitted to the filter unit through the prism sheet, the filter unit is adapted to be penetrated by a portion of a wavelength of the converted beam to form a filtered beam, when the transparent region inserts into the transmission path of the exciting beam, the exciting beam passes through the transparent region, a color of the filtered beam is different from a color of the exciting beam, and the light combining unit is located on the transmission path of the exciting beam and a transmission path of the filtered beam and combines the exciting beam and the filtered beam into an illumination beam.

20. The light source system as recited in claim 19, wherein the transparent region comprises a first transparent layer, and the first transparent layer is made of a transparent material.

21. The light source system as recited in claim 19, wherein the transparent region comprises a hollow region.

* * * * *